United States Patent
Lee et al.

(10) Patent No.: US 7,137,726 B2
(45) Date of Patent: Nov. 21, 2006

(54) LAMP HOLDER

(75) Inventors: Chung-Te Lee, Hsinchu (TW);
Kuang-Chou Lai, Jhongli (TW);
Ching-Kun Lai, Dacun Township,
Changhua County (TW)

(73) Assignee: AU Optronics Corp., Hsinchu (TW)

( * ) Notice: Subject to any disclaimer, the term of this patent is extended or adjusted under 35 U.S.C. 154(b) by 64 days.

(21) Appl. No.: 11/006,631

(22) Filed: Dec. 8, 2004

(65) Prior Publication Data

US 2006/0007707 A1    Jan. 12, 2006

(30) Foreign Application Priority Data

Jul. 9, 2004    (TW) .............. 93120624 A (51) Int. Cl.
*F21V 7/04* (2006.01)
*F21V 8/00* (2006.01)
*F21V 17/00* (2006.01)

(52) U.S. Cl. ............ 362/632; 362/633; 362/634
(58) Field of Classification Search ........ 362/632, 362/633, 634; 349/58, 61
See application file for complete search history.

(56) References Cited

U.S. PATENT DOCUMENTS

| | | | |
|---|---|---|---|
| 6,527,414 B1 * | 3/2003 | Moon | 362/249 |
| 2004/0012763 A1 | 1/2004 | Chuan-Pei Yu et al. | |
| 2004/0257792 A1 * | 12/2004 | Yu et al. | 362/31 |

FOREIGN PATENT DOCUMENTS

JP    2001-210126    8/2001

* cited by examiner

*Primary Examiner*—Sandra O'Shea
*Assistant Examiner*—James W Cranson, Jr.
(74) *Attorney, Agent, or Firm*—Rabin & Berdo, PC (57) ABSTRACT

A lamp holder used in a backlight module is disclosed. The lamp holder includes a supporting part, a fixing part, and U-shaped holding parts. The supporting part separates the diffusion sheet of the backlight module from the lamps by a distance. The fixing part fixes the supporting part to the back plane of the backlight module. The U-shaped holding parts are used to hold lamps and the opening width of each U-shaped holding part is substantially the same as the diameter of the lamp.

25 Claims, 7 Drawing Sheets

LAMP HOLDER

This application claims the benefit of Taiwan application Serial No. 93120624, filed Jul. 9, 2004, the subject matter of which is incorporated herein by reference.

BACKGROUND OF THE INVENTION

1. Field of the Invention

The invention relates in general to a lamp holder, and more particularly to a lamp holder using U-shaped holding parts to hold lamps.

2. Description of the Related Art

In order to meet the requirement of a large-scale liquid crystal display, the bottom lighting backlight module and its interior lamps have to be elongated. As the backlight module is configured upright, the interior lamps are usually curved downward for the gravity, which causes a serious shading issue on the display pictures. In order to prevent the downward deformation of the lamps, a lamp holder is generally used to clamp the middle parts of the lamps.

Figure 1:
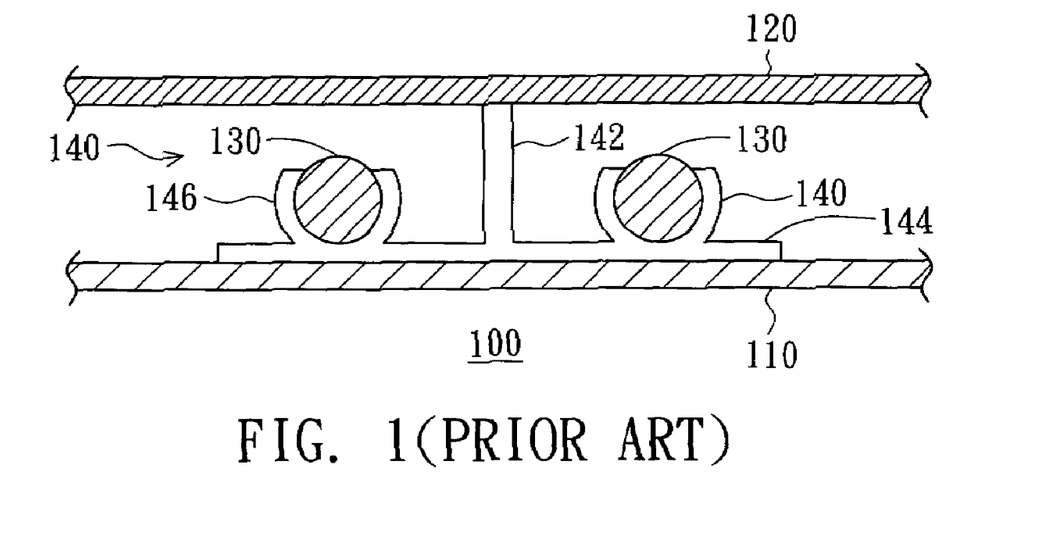
FIG. 1 is a partial cross-sectional view of a conventional backlight module.

Referring to FIG. 1, a partial cross-sectional view of the conventional bottom lighting backlight module is shown. The backlight module 100 includes a back plane 110, a diffusion sheet 120, lamps 130 and a lamp holder 140. The back plane 110 is used for setting the lamps 130, while the diffusion sheet 120 for uniformly diffusing the light emitted by the lamps 130. The lamp holder 140 includes a supporting part 142, a fixing part 144, and C-shaped clamping parts 146. The supporting part 142 separates the diffusion part 120 from the lamps 130 by a predetermined distance, and the fixing part 144 is fixed on the back plane 110. The C-shaped clamping parts 146 are used for clamping the lamps 130 in order to prevent the downward deformation of the lamps 130 as the backlight module 100 is configured upright.

However, when the lamp holder 140 is used to hold the lamps 130, the lamps 130 have to be pressed into the C-shaped clamping parts 146. For the opening width of the C-shaped clamping part 146 is smaller than the diameter of the lamp 130, the lamp 130 is easily pressed to break. In addition, the lamp holder 140 can hold one or two lamps only that makes a back light module has to be equipped with a lot of lamp holders, thereby complicating the manufacturing process.

SUMMARY OF THE INVENTION

It is therefore an object of the invention to provide a lamp holder. The lamp holder has U-shaped parts for holding the lamps, and the opening width of the U-shaped part is substantially equal to the diameter of the lamp. Therefore, the lamp-breaking issue mentioned above can be avoided.

The invention achieves the above-identified object by providing a lamp holder applied in a backlight module. The backlight module includes a back plane, a diffusion sheet, and a number of lamps. The lamp holder includes a supporting part, a fixing part, and U-shaped holding parts. The supporting part is disposed on the fixing part, and the fixing part is fixed onto an inner surface of the back plane facing to the diffusion sheet. The U-shaped holding parts are connected to the fixing part and the opening width of the U-shaped holding part is substantially equal to the diameter of the lamp.

Other objects, features, and advantages of the invention will become apparent from the following detailed description of the preferred but non-limiting embodiments. The following description is made with reference to the accompanying drawings.

DETAILED DESCRIPTION OF THE INVENTION

In the lamp holder according to a preferred embodiment of the invention, U-shaped holding parts are used to hold the lamps instead of the conventional C-shaped clamping parts to avoid the lamp breaking issue. In the following description, three embodiments are shown according to the relative orientations of the U-shaped holding part and the back plane of the backlight module.

EXAMPLE 1

Figure 2A:
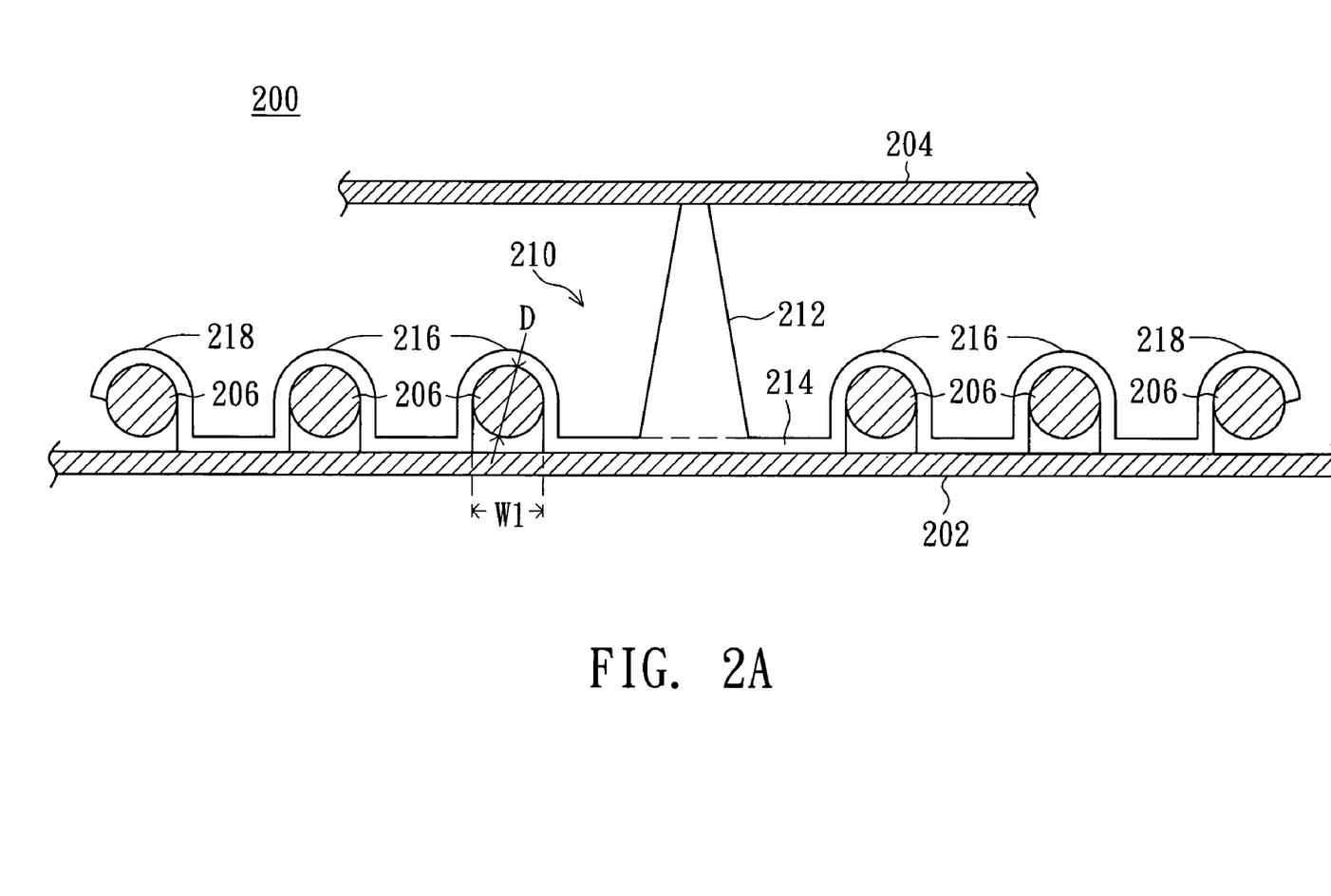
FIG. 2A is a cross-sectional view of the backlight module according to the first embodiment of the present invention.

Referring to FIG. 2A, a cross-sectional view of the backlight module according to the first embodiment of the invention is shown. The bottom lighting backlight module 200 includes a back plane 202, a diffusion sheet 204, and a lamp holder 210. The lamp holder 210 includes a supporting part 212, a fixing part 214, and a number of U-shaped and hook-shaped holding parts, wherein four U-shaped holding parts 216 and two hook-shaped holding parts 218 are taken for an example. The U-shaped holding parts 216 are connected to the fixing part 214 to form a serial pattern, and the hook-shaped holding parts 218 are respectively connected to two ends of the serial-patterned U-shaped holding parts 216. The holding parts at two ends of the lamp holder 210 can just be hook-shaped to have the effect of holding lamps. The supporting part 212 is disposed on the fixing part 214. In this embodiment, the supporting part 212 is disposed on the fixing part 214 located in the middle of the serial-patterned U-shaped holding parts 216. The fixing part 214 can be extended as needed for setting the supporting part 212 according to the size of the supporting part 212.

The supporting part 212 is used for separating the diffusion sheet 204 from the lamps 206 by an enough distance while the fixing part 214 for fixing the lamp holder 210 onto the inner surface of the back plane 202 facing to the diffusion sheet. The U-shaped holding parts 216 and the hook-shaped holding parts 218 are used for holding the lamps 206. The openings of the U-shaped holding parts 216 and the hook-shaped holding parts 218 face the inner surface of the back plane. The opening widths of the U-shaped holding part 216 and the hook-shaped holding parts 218 are substantially equal to the diameter D of the lamp 206. By using the U-shaped holding part 216 and the hook-shaped holding part 218 to clamp the lamps 206, the issue that lamps 206 are curved for the gravity as the backlight module is configured upright can be avoided. Moreover, in the embodiment one lamp holder can hold a number of lamps, thereby simplifying the manufacturing process of the backlight module 200.

Figure 2B:
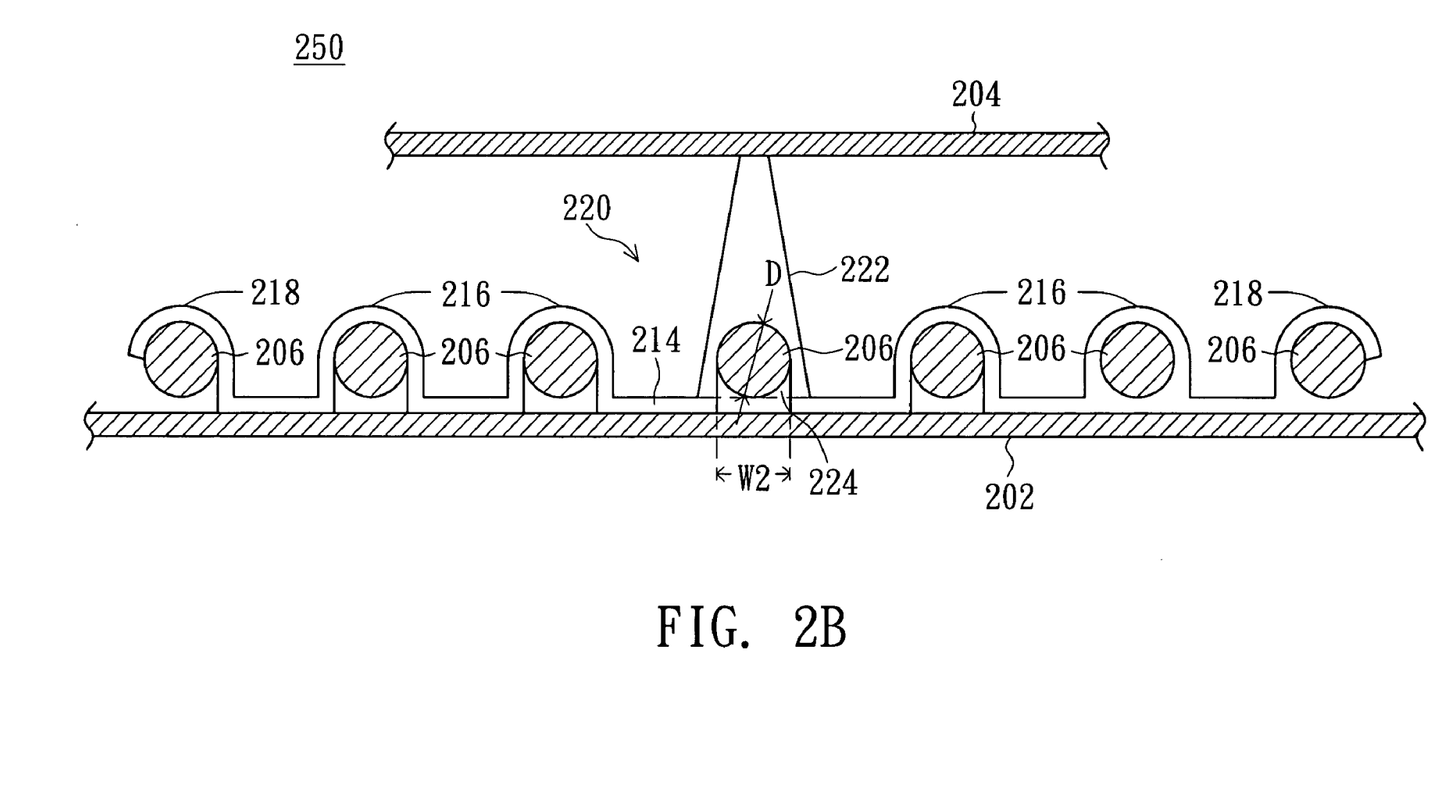
FIG. 2B is an alternative schematic diagrams of the lamp holder according to the first embodiment of the present invention.
Figure 2C:
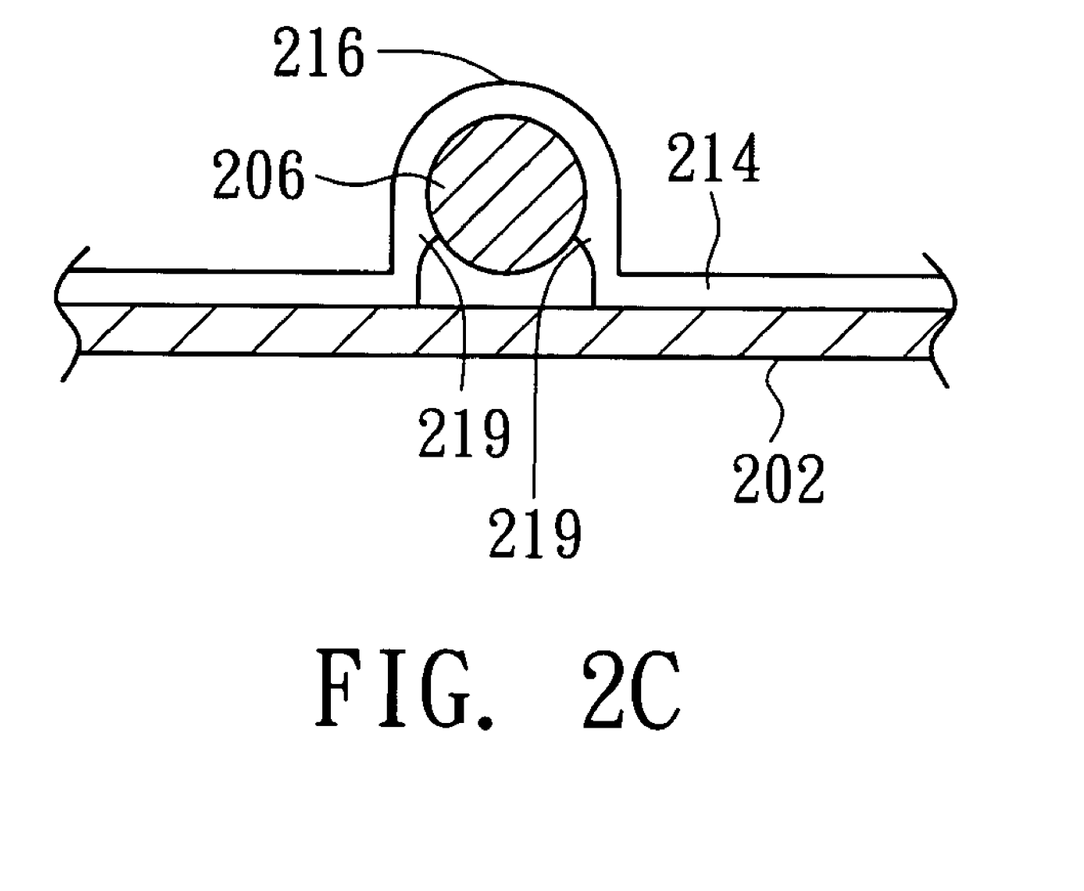
FIG. 2C is a cross-sectional view of the U-shaped holding part having bumps according to the first embodiment of the present invention.

FIG. 2B and FIG. 2C are alternative schematic views of the lamp holder according to the first embodiment of the invention. In FIG. 2B, the supporting part 222 in the lamp holder 220 of the backlight module 250 includes a U-shaped hole 224 for holding one more lamp 206. The opening width W2 of the U-shaped hole 224 is substantially equal to the diameter D of the lamp 206. In FIG. 2C, each inner sidewall of the holding parts 216 can also have a bump 219 for blocking the lamp 206 as the lamp 206 is placed into the holding part 216.

EXAMPLE 2

Figure 3A:
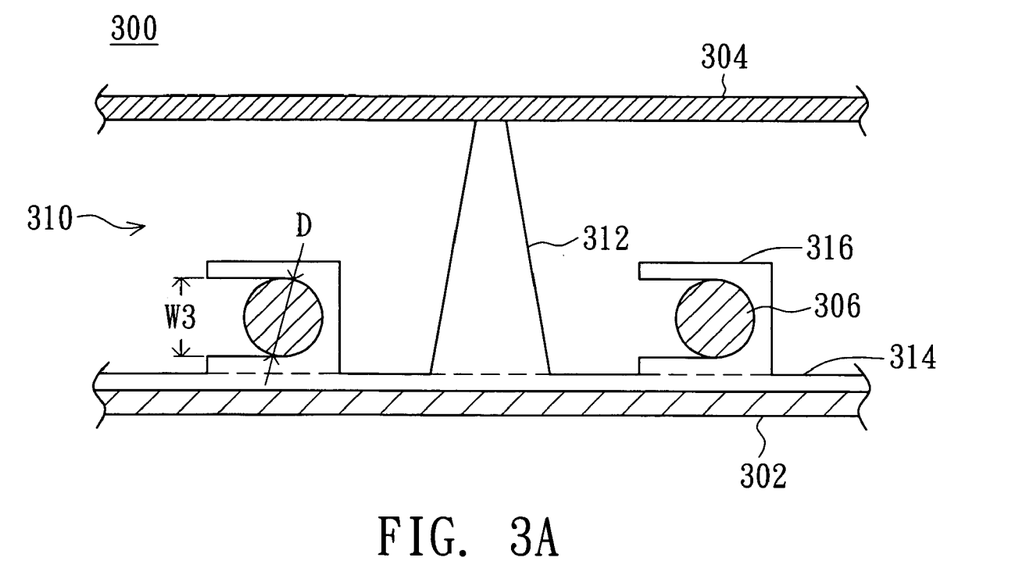
FIG. 3A is a cross-sectional view of the backlight module according to the second embodiment of the present invention.

FIG. 3A is a cross-sectional view of the backlight module according to the second embodiment of the invention. The bottom lighting backlight module 300 includes a back plane 302, a diffusion sheet 304, and a lamp holder 310. The lamp holder 310 includes a supporting part 312, a fixing part 314, and U-shaped holding parts 316. The openings of the U-shaped holding parts 316 are orientated in parallel to the back plane 302, and the opening width W3 of the U-shaped holding parts is substantially equal to the diameter D of the lamps 306. The U-shaped holding parts 316 and the supporting part 312 are connected to the fixing part 314. By using the U-shaped holding parts 316 to clamp the lamps 306, the lamp deformation as the backlight module 300 is configured upright can be avoided.

Figure 3B:
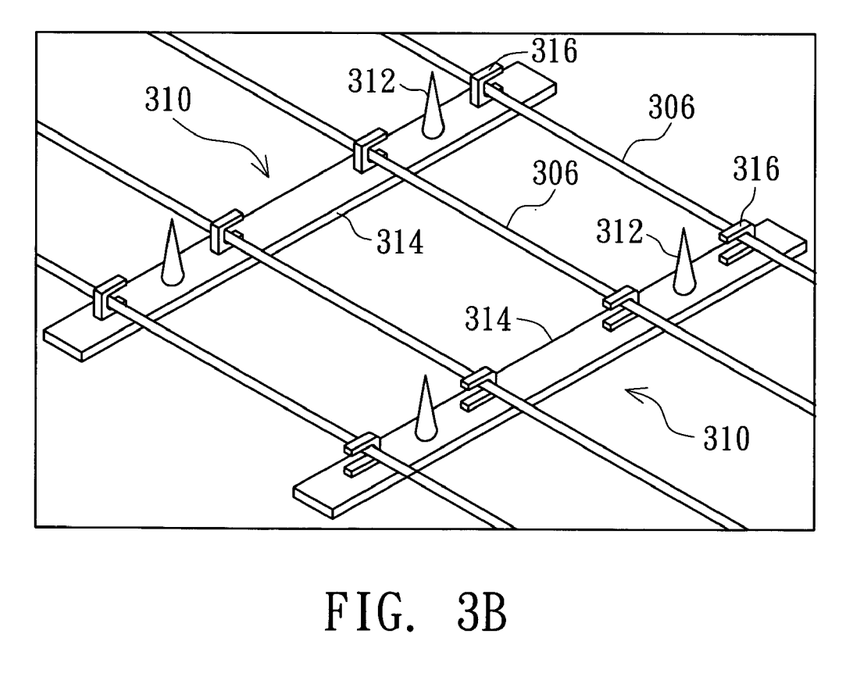
FIG. 3B is a perspective view of the backlight module according to the second embodiment of the present invention.

FIG. 3B is a perspective view of the backlight module according to the second embodiment of the invention. The backlight module 300 includes two lamp holders 310. The U-shaped holding parts on the two lamp holders 310 are orientated in reverse to each other, so each lamp 306 can be held tightly by the two lamp holders 310. When the shaking test is done in the fabrication of the backlight module 300, the lamps 306 will not move due to the restriction of the U-shaped holding parts 316.

EXAMPLE 3

Figure 4A:
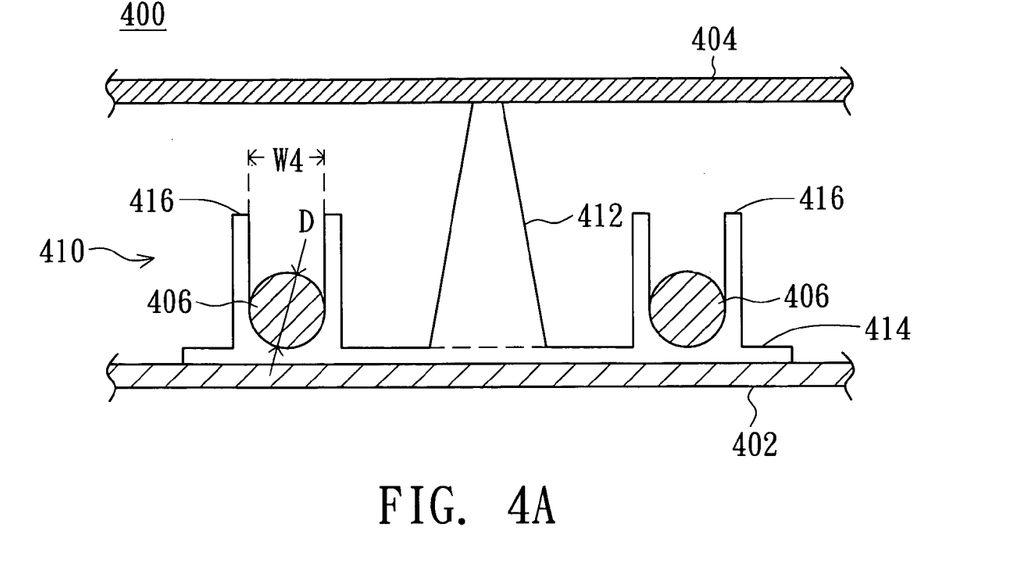
FIG. 4A is a cross-sectional view of the backlight module according to the third embodiment of the present invention.

Referring to FIG. 4A, a cross-sectional view of the backlight module according to the third embodiment of the invention is shown. The bottom lighting backlight module 400 includes a back plane 402, a diffusion sheet 404, and a lamp holder 410. The lamp holder 410 includes a supporting part 412, a fixing part 414, and U-shaped holding parts 416. The openings of the U-shaped holding parts 416 are orientated against the back plane 402, and the opening width W4 of the U-shaped holding parts 416 is substantially equal to the diameter D of the lamps 406. The U-shaped holding parts 416 and the supporting part 412 are connected to the fixing part 414. By using the U-shaped holding parts 416 to clamp the lamps 406, the deformation of the lamps 406 for the gravity as the backlight module 400 is configured upright can be avoided.

Figure 4B:
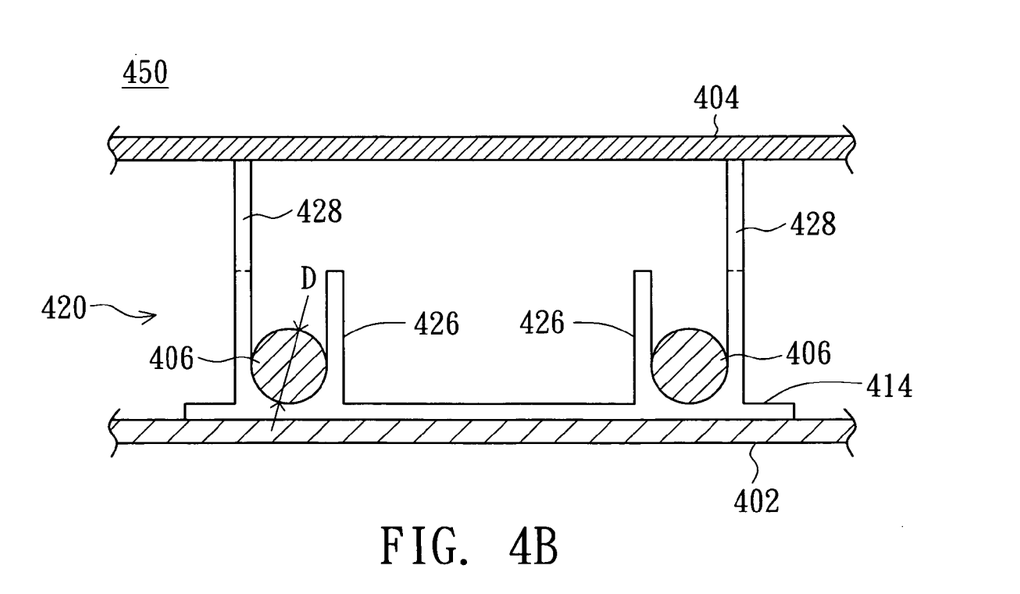
FIG. 4B is an alternative cross-sectional view of the backlight module according to the third embodiment of the present invention.
Figure 4C:
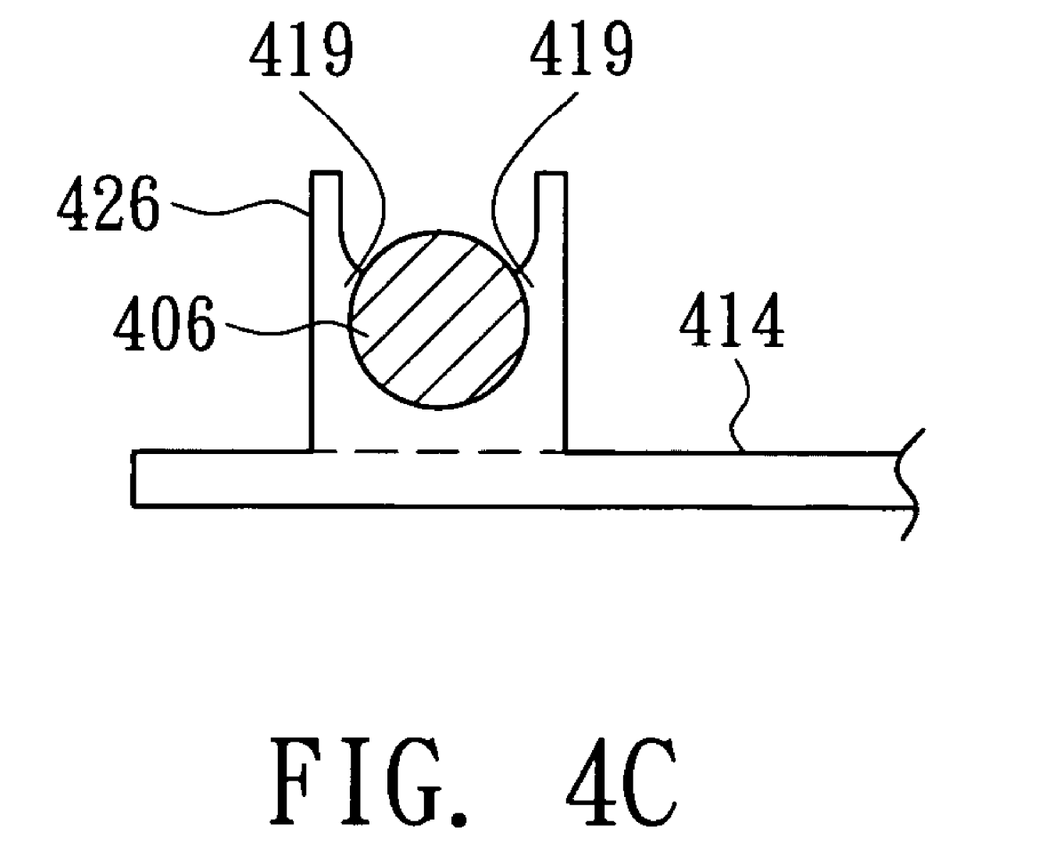
FIG. 4C is a cross-sectional view of the U-shaped holding part having bumps according to the third embodiment of the present invention.

FIG. 4B is an alternative view of the backlight module according to the third embodiment of the invention. The lamp holder 420 in the backlight module 450 includes U-shaped holding parts 426 and a fixing part 414. A supporting part 428 is formed at one end of the U-shaped holding part 426 as an extension in order to support the diffusion sheet 404. In addition, as shown in FIG. 4C, each inner sidewall of the U-shaped holding part 426 includes a bump 419 for blocking the lamp 406 as the lamp 406 is placed into the U-shaped holding part 426.

The lamp holders in the three above-mentioned embodiments are made of transparent materials so that the light emitted from the lamps will not be blocked. Or the lamp holders can be made of white materials so that the color of the light source will not be influenced. Moreover, the fixing part 414 can be screwed onto the back plane 402 or be fixed to the back plane 402 by hooks.

According to the above-mentioned preferred embodiments, the advantages of the lamp holder of the present invention lie on the lamp deformation for the gravity as the backlight module is configured upright can be avoided by using a U-shaped holding part having an opening width equal to the lamp diameter to hold the lamp. And the holding part can hold the lamp more effectively by two bumps on its inner sidewalls. In addition, the lamp holder of the invention can hold a number of lamps at a time, thereby simplifying the manufacturing process of the backlight module.

While the invention has been described by way of example and in terms of preferred embodiments, it is to be understood that the invention is not limited thereto. Rather, it is intended to cover various modifications and similar arrangements and procedures, and the scope of the appended claims therefore should be accorded the broadest interpretation so as to encompass all such modifications and similar arrangements and procedures.

What is claimed is:

1. A lamp holder, applied in a backlight module, the backlight module comprising a back plane, a diffusion sheet, and a plurality of lamps, the lamp holder comprising:
   a fixing part, fixed onto an inner surface of the back plane facing to the diffusion sheet;
   a supporting part, disposed on the fixing part; and
   a plurality of U-shaped holding parts, connected to the fixing part, wherein the opening width of each U-shaped holding part is substantially equal to a diameter of each lamp, and each inner sidewall of the U-shaped holding part has a bump.

2. The lamp holder according to claim 1, wherein the openings of the U-shaped holding parts face the inner surface of the back plane.

3. The lamp holder according to claim 2, wherein the U-shaped holding parts are connected to each other via the fixing part to form a serial pattern.

4. The lamp holder according to claim 3, further comprising a hook-shaped holding part connected to one end of the serial-patterned U-shaped holding parts.

5. The lamp holder according to claim 1, wherein the supporting part comprises a U-shaped hole, and the opening width of the U-shaped hole is substantially equal to the diameter of the lamp.

6. The lamp holder according to claim 1, wherein the openings of the U-shaped holding parts are orientated in parallel to the back plane.

7. The lamp holder according to claim 6, further comprising a plurality of second U-shaped holding parts and the openings of the second U-shaped holding parts are orientated in reverse to the openings of the U-shaped holding parts.

8. The lamp holder according to claim 1, wherein the openings of the U-shaped holding parts are orientated against the inner surface of the back plane.

9. The lamp holder according to claim 1, wherein the lamp holder is made of transparent materials or white materials.

10. A lamp holder, applied in a backlight module, the backlight module comprising a back plane, a diffusion sheet, and a plurality of lamps, the lamp holder comprising:

a fixing part, fixed onto an inner surface of the back plane facing to the diffusion sheet;

a plurality of U-shaped holding parts, connected to the fixing part, wherein the opening width of each U-shaped holding part is substantially equal to a diameter of each lamp, and each inner sidewall of the U-shaped holding part has a bump; and a supporting part, disposed at one end of one of the U-shaped holding parts.

11. The lamp holder according to claim 10, wherein the openings of the U-shaped holding parts are orientated against the inner surface of the back plane.

12. The lamp holder according to claim 10, wherein the lamp holder is made of transparent materials or white materials.

13. A backlight module, comprising:
a plurality of lamps;
a back plane, for setting the lamps;
a diffusion sheet, disposed substantially in parallel to the back plane; and
a lamp holder, fixed onto an inner surface of the back plane facing to the diffusion sheet, the lamp holder comprising:
a fixing part, connected to the back plane;
a supporting part, disposed on the fixing part; and
a plurality of U-shaped holding parts, connected to the fixing part, wherein the opening width of each U-shaped holding part is substantially equal to a diameter of each lamp, and each inner sidewall of the U-shaped holding part has a bump.

14. The backlight module according to claim 13, wherein the openings of the U-shaped holding parts face the back plane.

15. The backlight module according to claim 14, wherein the supporting part comprises a U-shaped hole.

16. The backlight module according to claim 13, wherein the openings of the U-shaped holding parts are orientated in parallel to the back plane.

17. The backlight module according to claim 16, wherein the backlight module further comprises a plurality of second lamp holders, each second lamp holder comprises a second U-shaped holding part for holding the lamps, and the openings of the second U-shaped holding parts are orientated in reverse to the openings of the U-shaped holding parts.

18. The backlight module according to claim 13, wherein the openings of the U-shaped holding parts are orientated against the inner surface of the back plane.

19. A backlight module, comprising:
a plurality of lamps;
a back plane, for setting the lamps;
a diffusion sheet, disposed substantially in parallel to the back plane; and
a lamp holder, fixed onto an inner surface of the back plane facing to the diffusion sheet, the lamp holder comprising:
a fixing part, connected to the back plane;
a plurality of U-shaped holding parts, connected to the fixing part, wherein the opening width of each U-shaped holding part is substantially equal to a diameter of each lamp, and each inner sidewall of the U-shaped holding part has a bump; and a supporting part, disposed at one end of one of the U-shaped holding parts.

20. The backlight module according to claim 19, wherein the openings of the U-shaped holding parts are orientated against the inner surface of the back plane.

21. A lamp holder, applied in a backlight module, the backlight module comprising a back plane, a diffusion sheet, and a plurality of lamps, the lamp holder comprising:
a fixing part, fixed onto an inner surface of the back plane facing to the diffusion sheet;
a supporting part, disposed on the fixing part; and
a plurality of U-shaped holding parts, connected to the fixing part, wherein the opening width of each U-shaped holding part is substantially equal to a diameter of each lamp, and a middle part of each lamp is held by at least one U-shaped holding part.

22. A backlight module, comprising:
a plurality of lamps;
a back plane, for setting the lamps;
a diffusion sheet, disposed substantially in parallel to the back plane; and
a lamp holder, fixed onto an inner surface of the back plane facing to the diffusion sheet, the lamp holder comprising:
a fixing part, connected to the back plane;
a supporting part, disposed on the fixing part, and projected from the fixing part toward the diffusion sheet; and
a plurality of U-shaped holding parts, connected to the fixing part, wherein the opening width of each U-shaped holding part is substantially equal to a diameter of each lamp;
wherein the fixing part and the supporting part are formed as an integrated piece.

23. The backlight module according to claim 22, wherein the fixing part, the supporting part and the U-shaped holding parts are integrated as a whole.

24. A backlight module, comprising:
a plurality of lamps;
a back plane, for setting the lamps;
a diffusion sheet, disposed substantially in parallel to the back plane; and
a lamp holder, fixed onto an inner surface of the back plane facing to the diffusion sheet, the lamp holder comprising:
a fixing part, connected to the back plane;
a plurality of U-shaped holding parts, connected to the fixing part, wherein the opening width of each U-shaped holding part is substantially equal to a diameter of each lamp; and
a supporting part, connected to and extended from one end of one of the U-shaped holding parts, and projected toward the diffusion sheet;
wherein the fixing part and the supporting part are formed as an integrated piece.

25. The backlight module according to claim 24, wherein the fixing part, the supporting part and the U-shaped holding parts are integrated as a whole.

* * * * *